(12) United States Patent
Hawkins et al.

(10) Patent No.: US 8,254,565 B2
(45) Date of Patent: Aug. 28, 2012

(54) HAND-HELD DEVICE

(75) Inventors: Jeffrey C. Hawkins, Atherton, CA (US);
Peter N. Skillman, San Carlos, CA
(US); William B. Rees, Menlo Park, CA
(US); Robert Y. Haitani, Menlo Park,
CA (US); **Michael Alexander
Yurochko, Los Altos, CA (US); Edward
Thomas Colligan**, San Jose, CA (US)

(73) Assignee: **Hewlett-Packard Development
Company, L.P.**, Houston, TX (US)

( * ) Notice: Subject to any disclaimer, the term of this patent is extended or adjusted under 35 U.S.C. 154(b) by 1085 days.

(21) Appl. No.: 12/022,834

(22) Filed: Jan. 30, 2008

(65) Prior Publication Data

US 2008/0117174 A1 May 22, 2008

Related U.S. Application Data

(63) Continuation of application No. 09/976,841, filed on Oct. 13, 2001.

(60) Provisional application No. 60/297,817, filed on Jun. 11, 2001.

(51) Int. Cl.
*H04M 1/00* (2006.01)
*H04M 9/00* (2006.01)
*H04M 3/00* (2006.01)
*G06F 3/02* (2006.01)
*G06F 3/00* (2006.01)
*G09G 5/00* (2006.01)

(52) U.S. Cl. .................. 379/433.07; 345/169; 708/145; 379/368

(58) Field of Classification Search .................. 379/58, 379/59, 368, 352, 353, 355.05, 355.07; 455/418, 455/550.1, 564; 341/22
See application file for complete search history.

(56) References Cited

U.S. PATENT DOCUMENTS

| | | | |
|---|---|---|---|
| 4,797,912 A | 1/1989 | Hashimoto | |
| 5,148,471 A | 9/1992 | Metroka et al. | |
| 5,410,593 A | 4/1995 | Kamota | |
| 5,500,643 A * | 3/1996 | Grant | 341/22 |
| 5,633,912 A | 5/1997 | Tsoi | |
| 5,673,040 A * | 9/1997 | Hargreaves et al. | 341/22 |
| 5,790,659 A | 8/1998 | Strand | |
| 5,870,492 A | 2/1999 | Shimizu et al. | |
| 5,918,188 A | 6/1999 | Doran | |
| 5,957,595 A | 9/1999 | Chen | |
| 5,996,956 A | 12/1999 | Shawyer | |
| 6,005,496 A * | 12/1999 | Hargreaves et al. | 341/22 |

(Continued)

FOREIGN PATENT DOCUMENTS

EP 0 898 222 * 7/1998

*Primary Examiner* — Fan Tsang
*Assistant Examiner* — Jeffrey Lytle

(57) ABSTRACT

A hand-held device that provides communication services and symbol processing is described. The device includes a case having a front side comprising a display and a lid having a transparent portion through which the display can be seen in a lid-closed state. In one version, the hand-held device comprises a QWERTY keyboard including an arrangement of digits as in a touch-tone area telephone keypad arrangement. In another version, the display includes a handwriting area for data entry using a stylus or other screen data entry device. In a closed position, the lid extends over the display and the keyboard, leaving another user input device physically accessible to touch for receiving input wherein the device performs processing responsive to receiving input from the physically accessible user input device in the lid closed state.

30 Claims, 13 Drawing Sheets

U.S. PATENT DOCUMENTS

| | | | |
|---|---|---|---|
| 6,028,923 A | 2/2000 | Kolb et al. | |
| 6,047,196 A * | 4/2000 | Makela et al. | 455/556.1 |
| 6,075,925 A | 6/2000 | Downing et al. | |
| 6,154,758 A | 11/2000 | Chiang | |
| 6,278,442 B1 * | 8/2001 | Griffin et al. | 345/169 |
| 6,295,052 B1 * | 9/2001 | Kato et al. | 345/179 |
| 6,487,602 B1 | 11/2002 | Thakker | |
| 6,606,082 B1 | 8/2003 | Zuberec et al. | |
| 6,665,173 B2 | 12/2003 | Brandenberg et al. | |
| 6,705,520 B1 | 3/2004 | Pitroda et al. | |
| 6,727,830 B2 | 4/2004 | Lui et al. | |
| 6,741,235 B1 | 5/2004 | Goren | |
| 6,774,927 B1 | 8/2004 | Cohen et al. | |
| 6,836,759 B1 | 12/2004 | Williamson et al. | |
| 7,048,456 B2 | 5/2006 | Keinonen et al. | |
| 7,171,108 B1 | 1/2007 | Masters et al. | |
| 7,218,242 B2 | 5/2007 | Scalisi et al. | |
| 7,231,229 B1 | 6/2007 | Hawkins et al. | |
| 7,260,390 B1 | 8/2007 | Skinner et al. | |
| 7,313,389 B1 | 12/2007 | Sharp et al. | |
| 7,395,089 B1 | 7/2008 | Hawkins et al. | |
| 7,512,952 B1 | 3/2009 | Liu et al. | |
| 2002/0086702 A1 | 7/2002 | Lai et al. | |
| 2002/0132633 A1 | 9/2002 | Johnson et al. | |
| 2002/0158812 A1 | 10/2002 | Pallakoff | |
| 2003/0001816 A1 | 1/2003 | Badarneh | |

\* cited by examiner

FIG. 3A

| Legend | |
|---|---|
| Shifted Symbol | Option Symbol |
| Normal Symbol | |

<- one hardware key

FIG. 3B — Complete Keyboard Layout

| Q | W | E | R | T | Y | U | I | O | P | |
|---|---|---|---|---|---|---|---|---|---|---|
| Cntrs | @ | $ | / | * | 1 | 2 | 3 | # | " | |
| q | w | e | r | t | y | u | i | o | p | |
| A | S | D | F | G | H | J | K | L | N/A | N/A Backspace |
| % | ( | ) | – | + | 4 | 5 | 6 | ' | | |
| a | s | d | f | g | h | j | k | l | | |
| N/A N/A | Z | X | C | V | B | N | M | . | N/A | N/A Return |
| Option | : | ! | ? | , | 7 | 8 | 9 | . | | |
| | z | x | c | v | b | n | m | , | | |
| N/A | Shift | Find | Tab | Space | N/A | ListType | N/A | Menu/Command | Launcher | |

| Action | Device Power-On-State | | | | |
|---|---|---|---|---|---|
| | Device Power Save State (including Active Headset Call) | Incoming Call | | Active Call | |
| | | Within 1s of Notification | After 1s of Notification | No Headset | Headset | Other |
| Opening the Lid | Transitions device to device power-on-state; Launches an application assigned to the lid (e.g. telephone application, by default). | Nothing | Answers call | Not Applicable (e.g. Lid already is open) | Nothing | Nothing |
| Closing the Lid | Nothing | Nothing | Silences ring, Ignores call, Transitions Device to a Device Power-save-State. | Hangs Up, Transitions device to a device power-save-state. | Transitions device to a device power-save-state; Does not hang up the call. | Transitions device to a device power-save-state. |

FIG. 7

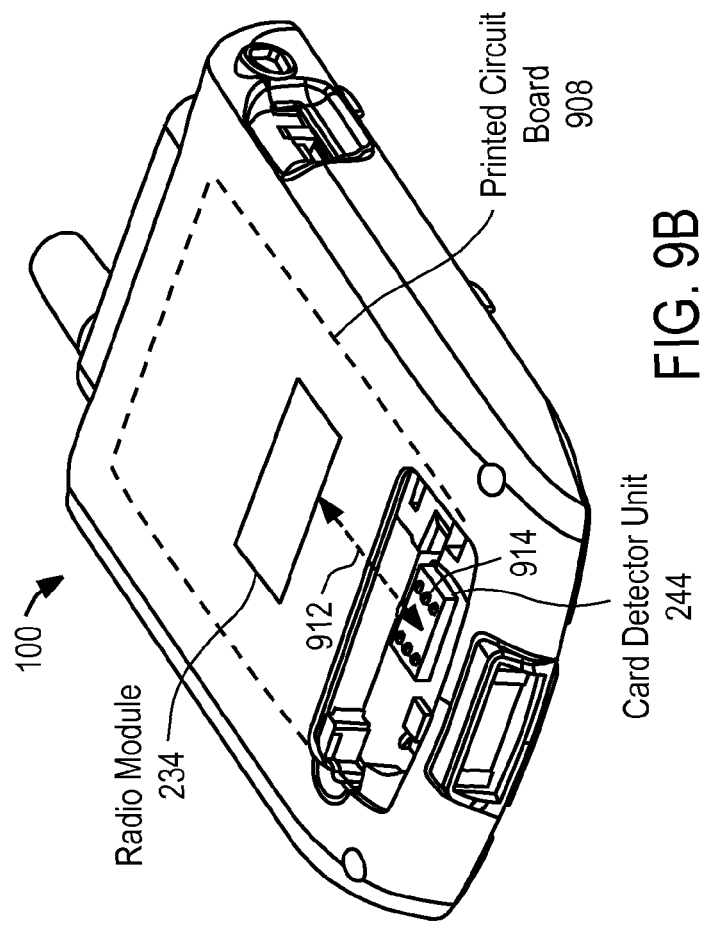
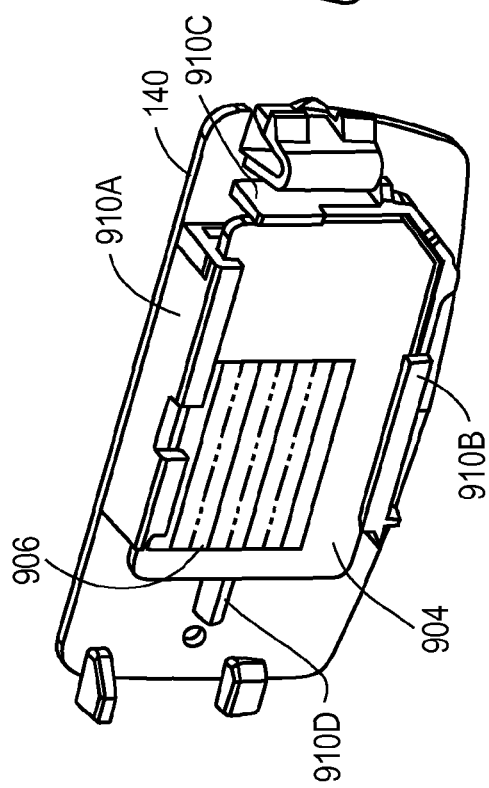
FIG. 9B
FIG. 9A

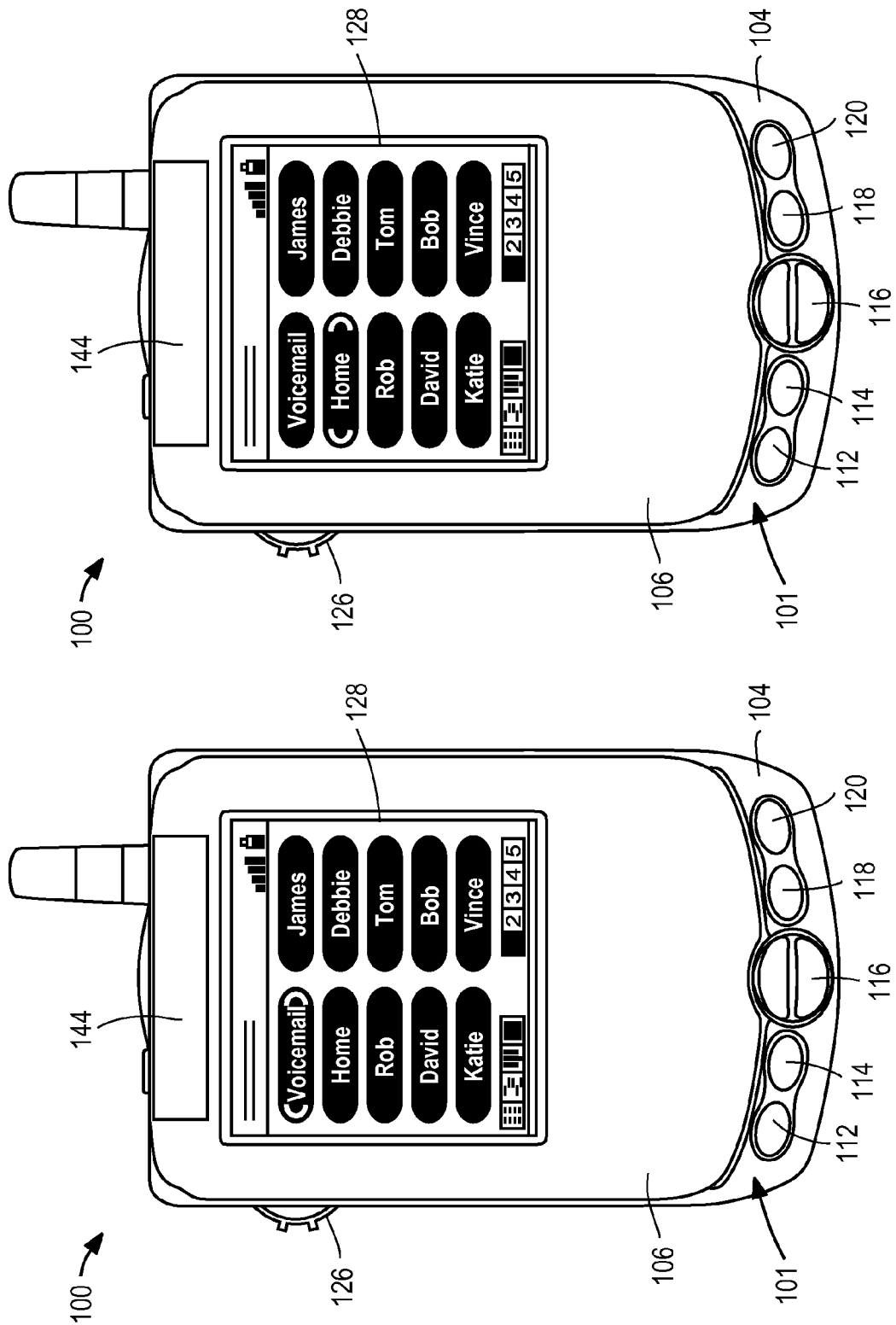

HAND-HELD DEVICE

CROSS-REFERENCE TO RELATED APPLICATION

This application is a continuation of U.S. patent application Ser. No. 09/976,841, having a filing date of Oct. 13, 2001, which is entitled "Hand-Held Device," inventors Jeffrey C. Hawkins, Peter N. Skillman, William B. Rees, Robert Y. Haitani, Michael Alexander Yurochko, and Edward Thomas Colligan, which application claims a benefit under 35 U.S.C. 119(e) from U.S. provisional patent application 60/297,817, having a filing date of Jun. 11, 2001 which is entitled "Hand-held Device," inventors Tom Bridgwater, Debbie Chyi, Robert Haitani, Jeff Hawkins, Eric Jacobsen, Will Rees, Peter Skillman, and Karl Townsend, the contents of each which being hereby incorporated by reference.

BACKGROUND

1. Field of Art

The present invention relates generally to systems and methods for a hand-held computing device providing communication services and symbol processing.

2. Description of the Related Art

The integration of services into hand-held devices such as personal digital assistants often involves an increased cost of time to the user to adapt to a new man-machine interface. The man-machine interface aspect of the data entry mechanisms is crucial to decreasing the learning curve time customers need to fully utilize the device for performing its various functions in order to decrease customer frustration. The ease of manipulation of data entry mechanisms enhances the overall device experience.

It is desirable to strike an appropriate balance between burdening the user with a bulkier device on the one hand with dedicated data entry mechanisms as part of the physical interface and on the other hand providing a more limited man-machine interface requiring the user to have to learn more data entry techniques or to consume more time for data entry.

The man-machine interface impacts the acceptability of the device to users because it impacts the extent of services provided, the effective use of the services, and the overall reliability of the device.

SUMMARY

The present invention provides for various embodiments of a hand-held device for providing communication services, including voice communications, and symbol processing. In one embodiment, the hand-held device comprises a case. The case encloses control logic, for example hardware and/or software, embodying functionality for providing communication services and control logic for performing symbol processing. For example, the case may include a radio functionality for providing communication services. Examples of such communication services are a cellular telephone functionality, text messaging, or wireless Internet access. In the embodiment, a front side comprises a touch-sensitive display and application buttons. In addition, the device comprises a lid comprising a speaker and a transparent portion. In this embodiment, the lid is hinged to the front side. In a closed position, the lid extends over the display, leaving the application physical buttons physically accessible to touch for receiving input wherein the device performs processing responsive to receiving input from the application buttons in the lid closed state.

The lid having a transparent portion advantageously provides convenience to the customer and protection of the device at the same time. For example, a user can see the identity of who is calling on the display without opening the lid while at the same time providing a protective cover of the device's display. The lid itself can also be used to perform functions. For example, closing the lid may turn off the display and place the device in a power saving state. In one embodiment, the power saving state does not affect the processing of the radio module.

In one embodiment, the front side of the device further has a keyboard. An example of a keyboard that may be used is a QWERTY keyboard. The lid in this embodiment extends over the keyboard in the lid closed state. In another aspect of this embodiment, the keyboard may comprise an arrangement of the symbols "0" to "9" in a traditional telephone keyboard arrangement. This similar arrangement advantageously allows a user to adjust to using the keyboard more readily than if the user had to learn a new arrangement. Similarly, in another aspect, a key associated with the telephone keyboard arrangement has a telephone keypad key indicator for distinguishing a telephone keypad key from other types of keys of the keyboard. This advantageously allows a user to find these keys more readily when using the device.

In another embodiment of the invention, instead of a keyboard area, the touch-sensitive display also includes a handwriting area for data entry. Typically, a user will use a screen data entry device such as his finger or a stylus to indicate a symbol for entry or to select an item from a menu.

BRIEF DESCRIPTION OF THE FIGURES

The figures depict one or more embodiments of the present invention for purposes of illustration only. One skilled in the art will readily recognize from the following discussion that alternative embodiments of the structures and methods illustrated herein may be employed without departing from the principles of the invention.

FIG. 3A illustrates a legend for understanding the symbols represented by each key of the embodiment of a keyboard layout in FIG. 3B.

FIG. 3B illustrates an embodiment of a QWERTY keyboard layout in which the normal symbol, shifted symbol and option symbol for each key are displayed according to the legend in FIG. 3A.

FIG. 7 illustrates a matrix table showing examples of actions taken responsive to the state of the lid in accordance with the invention.

FIG. 9A illustrates a block diagram of an embodiment of a door having an identification card holder holding an embodiment of a subscriber identification module (SIM) card.

FIG. 9B illustrates a block diagram view of the device with the door removed to show a card detector unit.

FIGS. 11A and 11B illustrate examples of displays shown to a user in response to activation of a user input device on a side of the device.

DETAILED DESCRIPTION

Figure 1B:
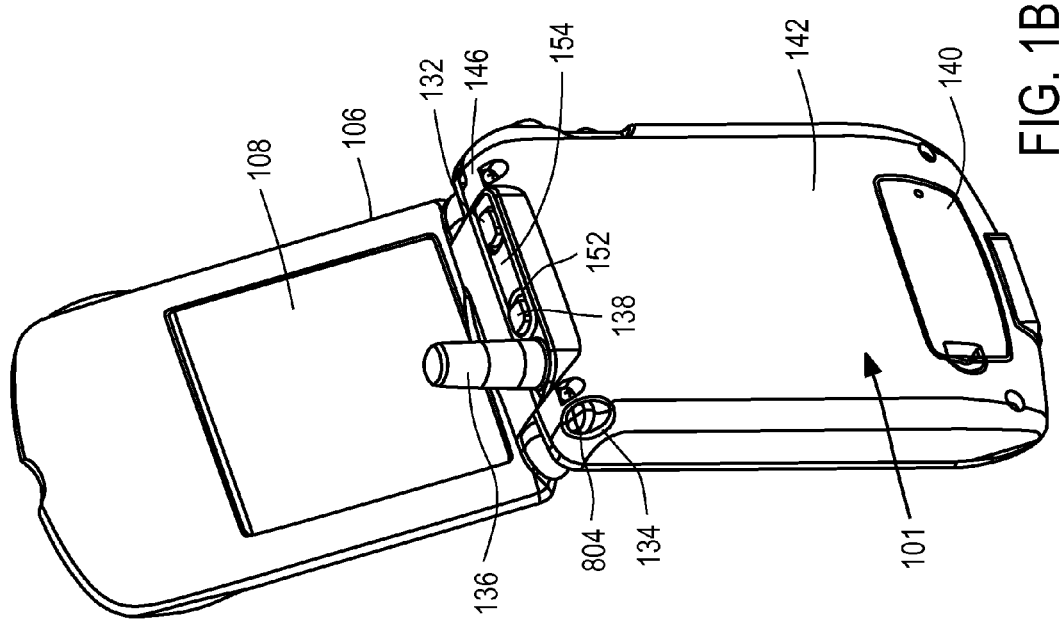
FIG. 1B illustrates a back perspective view of an embodiment of a hand-held computing device with a lid opened in an extended position in accordance with the present invention.
Figure 1A:
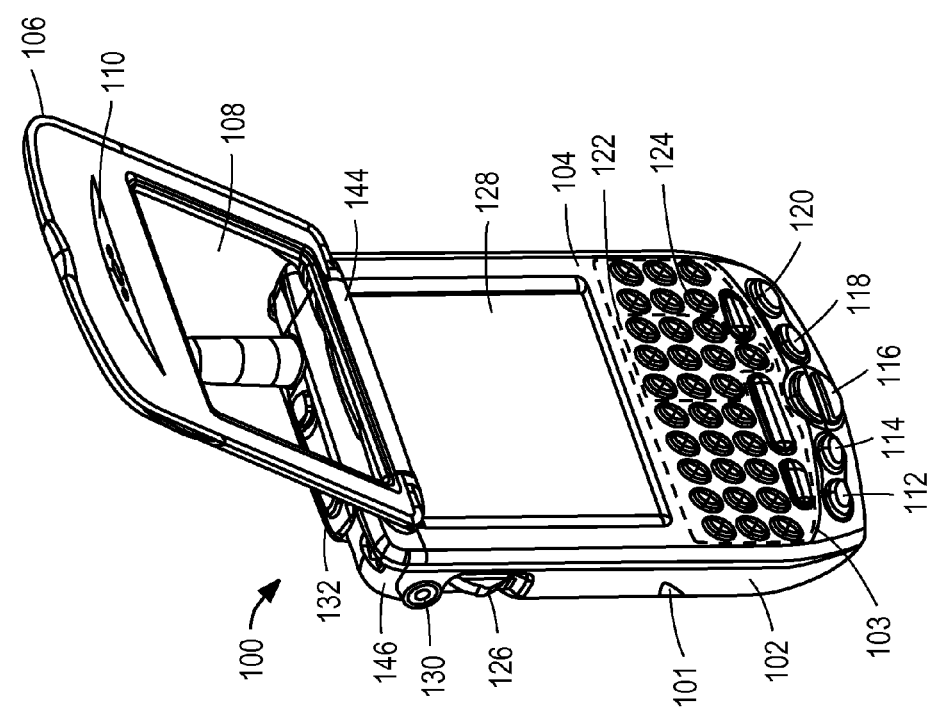
FIG. 1A illustrates a front perspective view of an embodiment of a hand-held computing device with a lid opened in an extended position in accordance with the present invention.

FIG. 1A illustrates a front view of an embodiment of a hand-held computing device with a lid opened in an extended position in accordance with the present invention. The embodiment of a hand-held device 100 depicted in FIG. 1A comprises a case 101 having a front side 104, and sides, for example, a first side 102. The front side 104 comprises a display 128, in this embodiment a liquid crystal display (LCD) that is a touch-sensitive display. A user may use his or her finger or a stylus (See FIG. 8A) for data entry, for example, by indicating selections from a menu. In one embodiment, the display is a color display that displays color images. The front side 104 also comprises a keyboard 103, e.g. a QWERTY keyboard. Each key (e.g. 124) of the keyboard is slanted in the same direction or at the same angle as the other keys in this embodiment. Also as shown, a key may have an oval shape.

User input devices embodied as application buttons 112, 114, 116, 118, 120 are also shown. In this embodiment, one of the application buttons 112 is associated with a telephone application. Another application button 114 is associated with a calendar application. Another application button 116 is associated with a scroll-up, scroll-down feature. Another application button 118 may launch an Internet access application. An application button may be associated with more than one function or more than one an application. For example, one of the application buttons may be associated with an application that provides Internet access and may also double in an option state, for example, for activating another application, examples of which are a memo pad, a to do list, an application providing time in other places or a calculator application. In another example, an application button 120 may be associated with a messaging service, examples of which are electronic mail, e-mail, and Short Message Service (SMS) messaging.

Attached to the front side 104 above the display 128 is a lid 106. In this embodiment, the lid 106 is a flip lid that is hinged 144 above the display. The lid includes a transparent portion 108 through which a user can see the display even if the lid is closed. The lid 106 further has a speaker 110 in this embodiment.

As illustrated in this embodiment, the first side 102 includes a user input device, in this embodiment, a jog rocker 126. Also included on the side 102 of the device is a plug-in socket 130 for a hands-free speaker attachment. Examples of a hands-free speaker attachment may include a full headset or a single earpiece.

FIG. 1B illustrates a back side 142 of the embodiment of the hand-held device of FIG. 1A. Also shown is a top part 146 having an antenna 136, and a ringer switch 132 which interact with a radio module (See FIG. 2 234) inside of the case that provides for radio communications including cellular telephone functionality. In this embodiment, a power switch 138 is shown on the upper portion of the device. In this embodiment, a two-color light emitting diode (LED) 152 is shown on the upper portion of the device. In this embodiment, an infrared panel port 154 is shown on the upper portion of the device. The top part of the device includes an opening of a stylus holder 134. The stylus holder 134 (See FIG. 8B) extends cylindrically down the back side of the device. In this illustration of an embodiment of the device, a stylus is seated in the device as illustrated by a head 804 of the stylus. In addition, the back side 142 is shown in this embodiment to comprise a door 140. The door holds an identification card (see FIG. 9B). One example of such an identification card is a subscriber identification module (SIM) card typically used with portable telephones used within the Global System for Mobile (GSM) communications networks. This feature allows the user to place the card in another device. For example, if a user is on another continent, the user can slip the card into another voice communication device such as a telephone designed to work at the frequencies allocated for that continent, country or group of countries.

Figure 1C:
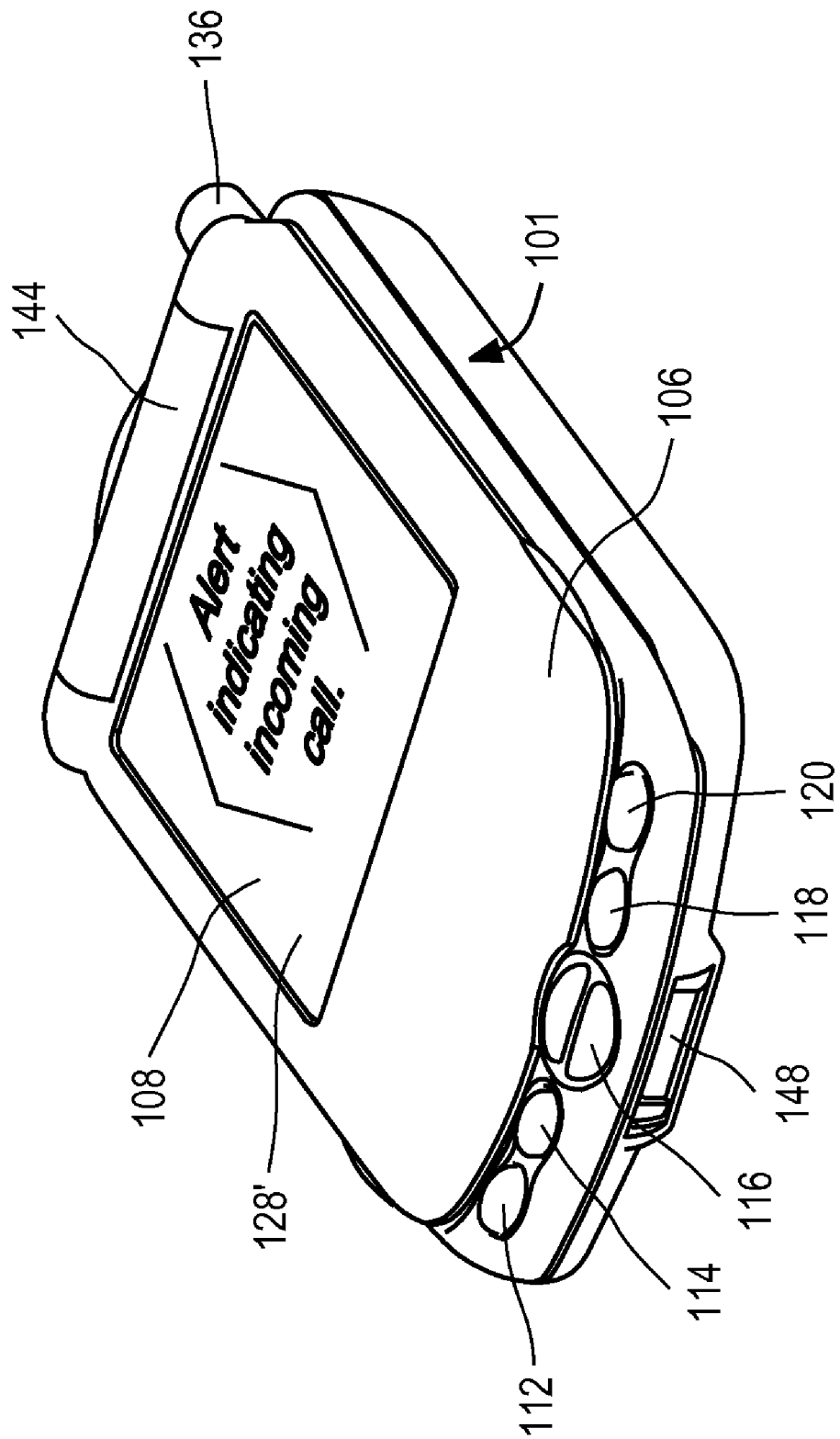
FIG. 1C illustrates a view of the front side of the embodiment of the hand-held device of FIG. 1A in a lid closed state in accordance with the present invention.

FIG. 1C illustrates a view of the front side of the embodiment of the hand-held device of FIG. 1A in which the lid 106 is in a closed position. The lid extends over the keyboard and the display in the closed position. The lid having a transparent portion 108 provides a convenience to the customer and protection to the display of the device at the same time. For example, an alert of an incoming call notification is displayed on the display which is visible through the transparent lid. In this way, the lid also provides a protective cover of the device's display.

Figure 2:
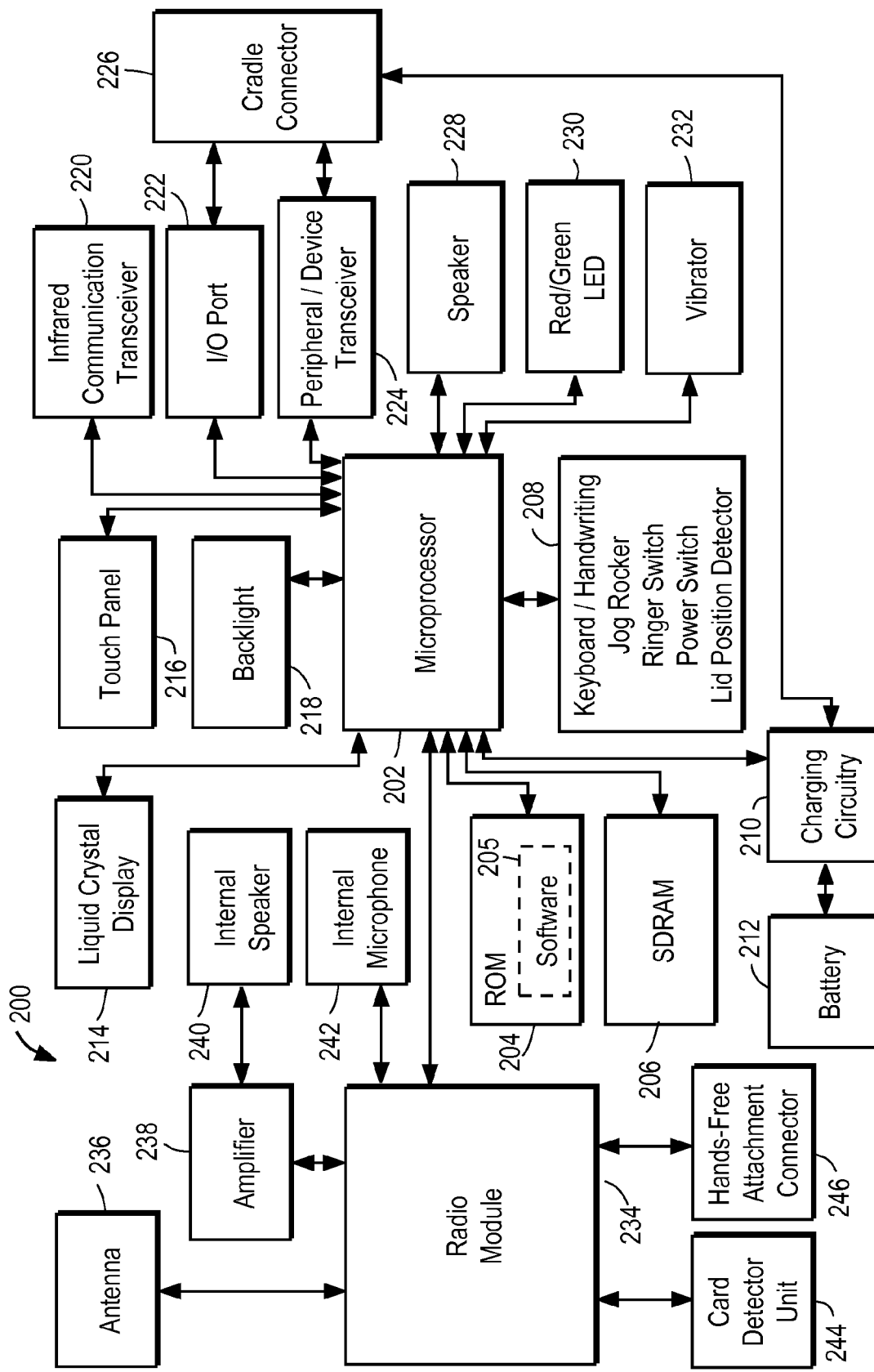
FIG. 2 illustrates a block diagram of an embodiment of a system enclosed within the case of the hand-held device comprising control logic for performing functions including functions related to communication services and symbol processing.

The case 101 encloses control logic, for example hardware and/or software, for providing communication services and control logic for symbol processing. Examples of symbols are letters, numbers, punctuation marks, emoticons typically used in e-mail messages and mathematical symbols. An example of communication services is voice communications. FIG. 2 illustrates a block diagram of an embodiment of a system 200 comprising units making up the hardware and/or software for performing these functions. The system may be implemented in a printed circuit board. The system comprises a microprocessor 202, a read only memory (ROM) 204, a synchronous dynamic random access memory (SDRAM) 206, a user interface unit 208 for processing input from the keyboard 103 or a handwriting area (see FIG. 10, 1002), the jog rocker 126, the ringer switch 132 and the power switch 138. Also this unit 208 detects the state of the lid position to determine if the lid is closed or open. Connected to the microprocessor as well is charging circuitry 210 for providing power from the battery 212. In one embodiment, the microprocessor is a Dragonball VZ MC68VZ328 33 MHz processor. In one embodiment, the battery is a Li-Ion 600 mAH battery. The charging circuitry is also connected to a cradle connector 226. The microprocessor is also connected with a liquid crystal display unit 214, a touch panel unit 216 and a backlight unit 218. The microprocessor 202 is also connected to a peripheral device transceiver 224, an example of which is a Universal Serial Bus (USB) transceiver, and an input/output (I/O) port 222, an example of which is an EIA-232 or a RS-232 port, both of which are also connected to the cradle connector 226. The microprocessor 202 is also connected to an infrared communication transceiver 220, an example of which is an Infrared Data Association (IrDA) transceiver. The microprocessor is also connected with speaker unit 228, an example of which is a piezo speaker, a red/green light emitting diode (LED) 230 unit, and a vibrator unit 232.

The microprocessor is also connected to a radio module 234 that provides for radio communications including cellular telephone functionality. An example of a radio module that may be used is a Wavecom Wismo GSM Module. Other services provided include Internet access and text messaging. An example of a text messaging service is the Short Message Service (SMS) which provides for sending and receiving short text messages from the hand-held computing device to another communication device, for example a personal digital assistant or a mobile phone.

The radio module is connected to an antenna 236, an amplifier 238 which is also connected to an internal speaker 240. The radio module is also connected to an internal microphone 242 as well as a card detector unit 244 and a hands-free attachment connector 246.

Those of skill in the art will understand that control logic, for example hardware and/or software, enclosed within the device, for example the system depicted in FIG. 2, processes input from user input devices in different forms and performs functions with respect to the input. For example, the user interface unit 208 may be embodied in hardware and/or software under the control of the microprocessor 202. The microprocessor 202 may execute software instructions for receiving input and responding to it appropriately from software 205 stored in a memory such as the read only memory 204, or random access memory such as the shown SDRAM 206 and/or in the user interface unit 208.

A keyboard, such as a QWERTY keyboard, is advantageous for e-mail and other forms of electronic messaging in a hand-held device.

As shown in the legend of FIG. 3A, associated with each key of the keyboard are three symbols, a normal symbol, a shifted symbol, and an option symbol.

In one version of the invention, a version of a QWERTY keyboard is used. For example, FIG. 3B illustrates an example of a complete keyboard layout. The keyboard comprises the following keys: the letters a-z (26 keys), punctuation marks such as a period "." key, the " . . . " symbol key, and keys for such functions as "Space", "Return", "Backspace", as well as a "Shift" key, an "Option" key, and a "Menu/Command" key. As shown, in the option state, the "Shift" key performs a "Find" function, and the "Menu/Command" key provides a "Launcher" key for launching a display for accessing applications. It will be noted that beginning in the top row at the left side, the first six letters from left to right are "qwerty".

In the embodiment of FIG. 3B, the normal symbol, shifted symbol and option symbol represented by each key is displayed according to the legend in FIG. 3A. The keyboard lets a user enter different symbols represented by a single key via the use of modification states, for example Shift and Option, as illustrated in FIG. 3A. Other keys function the same in more than one modification state.

Figure 6A:
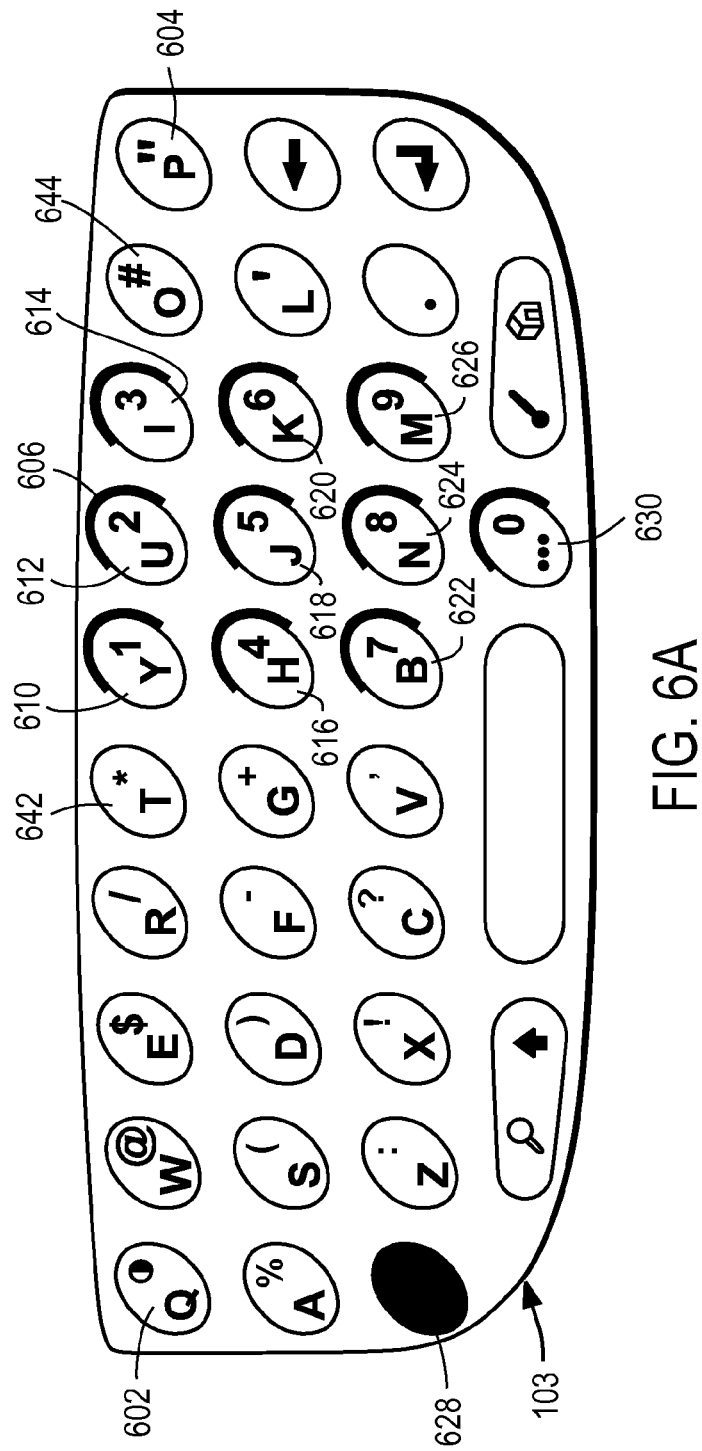
FIG. 6A illustrates an embodiment of a QWERTY keyboard of the hand-held device in accordance with the present invention.

An example of a QWERTY keyboard using the states of the keyboard layout of FIG. 3B is shown in FIG. 6A. In the normal, unmodified state, the keys produce the main character printed on them. For example, pressing key 602 in FIG. 6A will cause a "q" to be produced in the unmodified state, and key 604 in FIG. 6A will cause a "p" to be produced according to the keyboard layout illustrated in FIG. 3B.

In this example embodiment, the "Shift" key is a modifier key. In this example layout, the "Option" key is also a modifier key.

There are two ways to use the modifier keys (Shift and Option) to enter a shift- or option-modified character. One way known as serial modification means pressing and releasing the modifier key and then pressing the key to be modified. In other words, the keys are typed one after the other. Another way is known as parallel modification and involves pressing and holding a modifier key. In one embodiment of the invention both forms of modification are used. In another embodiment, only serial modification would be used. In a different embodiment, only parallel modification would be used.

The shift modification state is discussed next. There are two "Shift" states to consider, both the "Shift" and "Shift Lock" states. In the Shift state, the keys produce a capital version of the main character printed on them.

Figure 4:
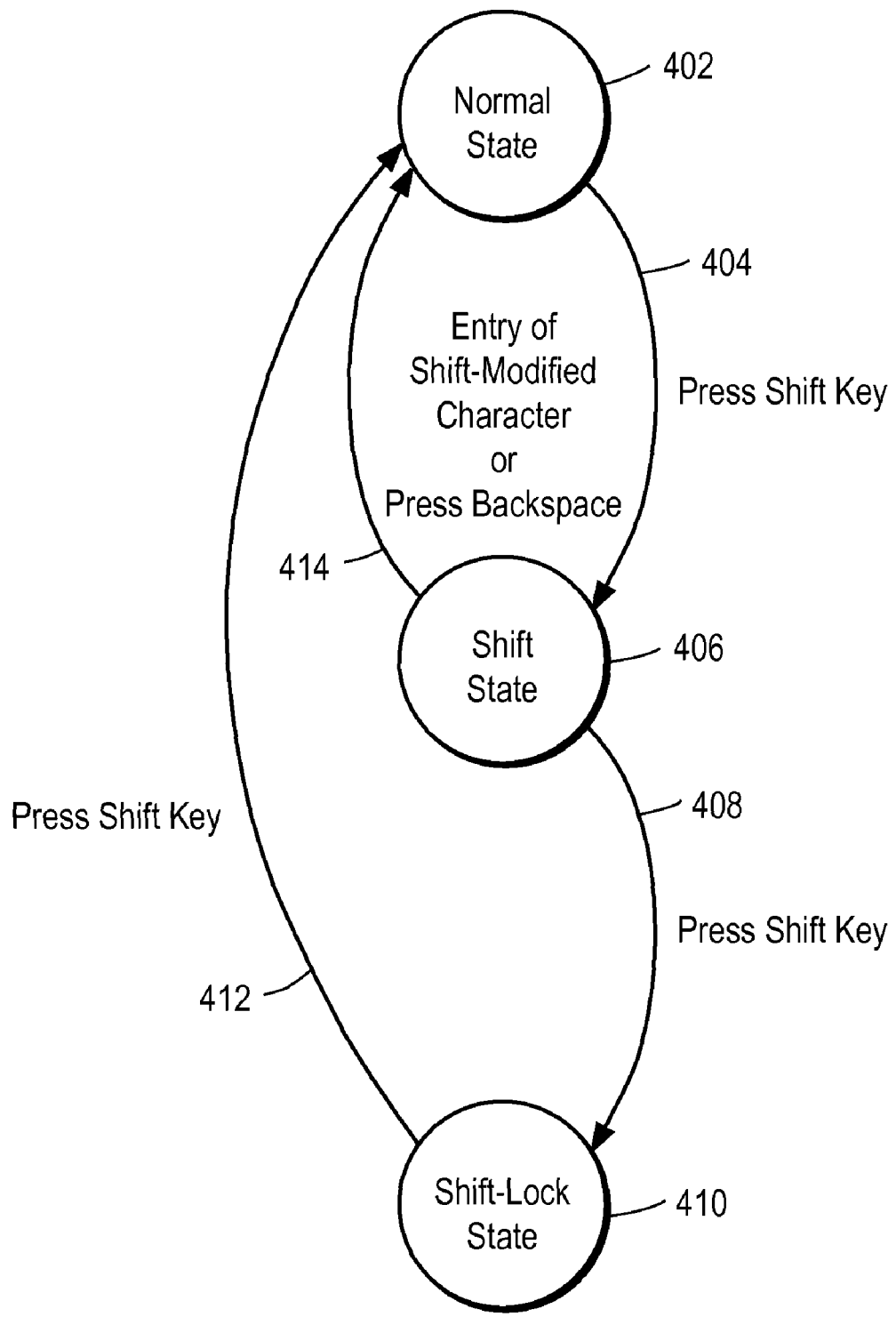
FIG. 4 illustrates a state diagram of an embodiment of a sequence of key strokes for maneuvering within and between a normal state, a Shift state and the Shift Lock modification states.

FIG. 4 illustrates a state diagram of an embodiment of a sequence of key strokes for maneuvering within and between the normal state 402, the Shift state 406 and the Shift Lock 410 modification states. For example, receiving input indicating that the 404 Shift key has been pressed once puts the device in Shift state 406. The Shift state 406 is canceled upon the entry 414 of the Shifted-modified character. Also, pressing backspace 414 clears the Shift Lock state and places the state back to Normal State. However, by pressing backspace, the previous character may also be deleted. Pressing Shift 408 in the Shift state puts the device in Shift Lock state 410. Shift Lock state 410 is not canceled upon the entry of the Shifted-modified character.

Pressing Shift 412 in Shift Lock state clears the state.

Another example of a modification is the "Option" state. In the Option state, a key produces another symbol. For example, in FIG. 3B according to the legend of FIG. 3A, in the Option state, if the user presses the "m" key, a "9" is produced.

Figure 5:
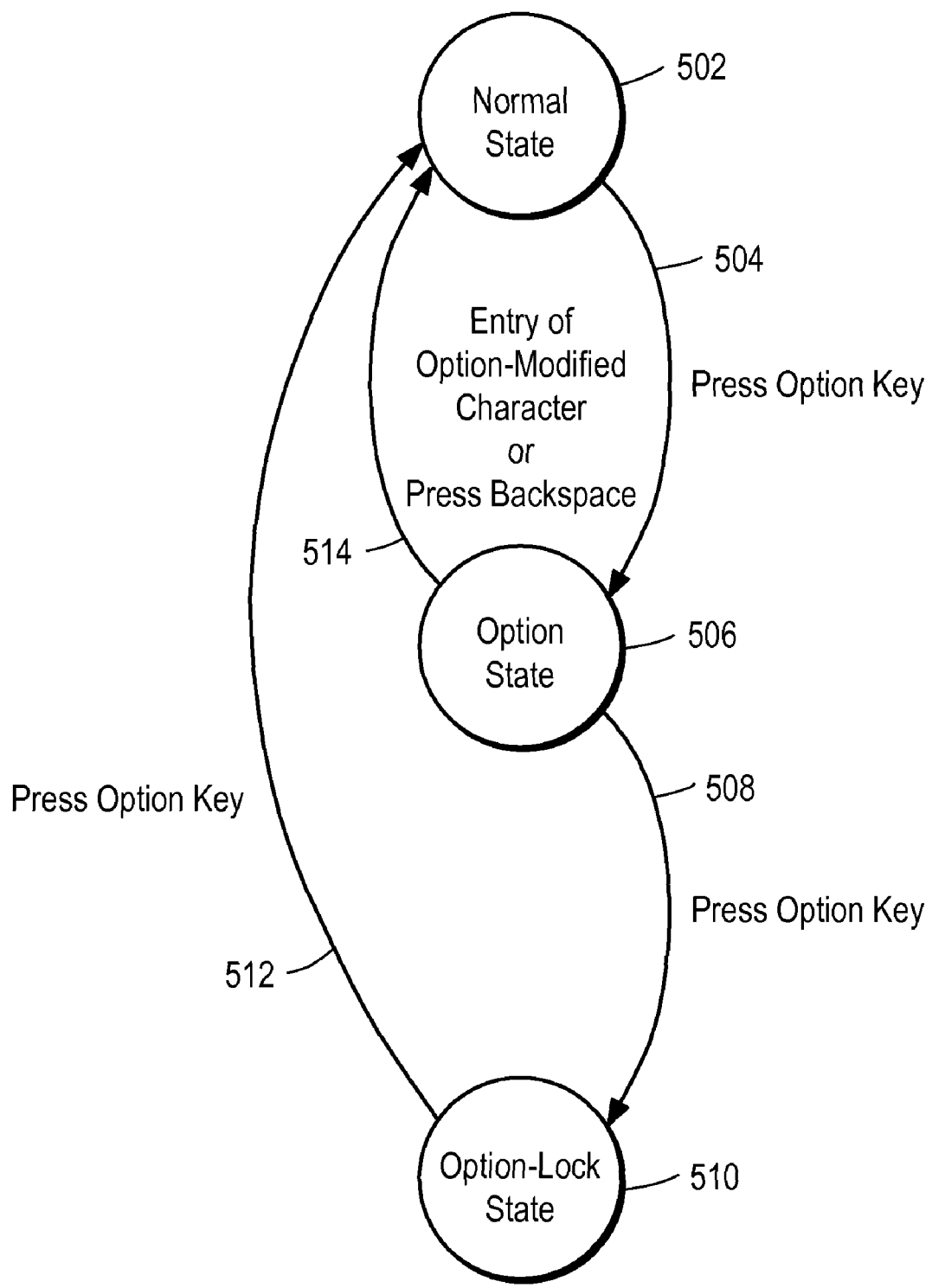
FIG. 5 illustrates a state diagram of an embodiment of a sequence of key strokes for maneuvering within and between the normal state, the Option state and the Option Lock modification states.

FIG. 5 illustrates a state diagram of an embodiment of a sequence of key strokes for maneuvering within and between the normal state 502, the Option state 506 and the Option Lock 510 modification states. For example, pressing 504 the Option key once puts the device in Option state 506. The Option state 506 is canceled upon the entry 514 of the Option-modified character. Also, pressing backspace 514 clears the Option Lock state and places the state back to Normal state. However, by pressing backspace, the previous character may also be deleted. Pressing Option 508 in the Option state puts the device in Option Lock state 510. Option Lock state 510 is not canceled upon the entry of the Option-modified character.

Pressing Option 512 in the Option Lock state clears the state.

Typically, there is a repeat rate associated with action of a key or combination being held down. In one embodiment, all text entry has the same repeat rate. For instance, holding down the "j" key will produce j's at the same rate as holding down shift+j produces J's and option+j produces 5's.

The lid in the closed position prevents unintended entry from the keyboard when the lid is pressed down against the keyboard because input from the keyboard is disabled when the lid is in the closed position. For example, the user interface unit 208 shown in FIG. 2 receives input from the keyboard.

Under the programmed control of the microprocessor 202, the lid-closed state is recognized and the input is not processed. Additionally there are other power-saving aspects of the device in a lid-closed position. In one example of a power-saving aspect of the device, responsive to the device being in a lid-closed state and the device being in a device-power-on state, the device disables a repeat functionality associated with the user input device. A typical scenario is that something in a briefcase or purse is pressing against the power button. An application button 112, 114, 118, 120 or the scroll button 116 is also being pressed by something. By disabling the repeat functionality, the drain on the battery is reduced. In another example of a power-saving aspect of the device in a lid-closed state and a device-power-on state, a timeout setting for receiving indication of further activation of the device is shorter than in the lid-open state thereby also reducing the drain on the battery.

In one aspect of the invention, a keyboard provides for an arrangement of the digits "0" to "9" similar to their arrangement on a touch-tone telephone keypad. This similar arrangement advantageously allows a user to adjust to using the keypad more readily than if the user had to learn a new arrangement.

FIG. 6A illustrates an embodiment of a keyboard 103 and a subset of keys 610, 612, 614, 616, 618, 620, 622, 624, 626, 630 whose option symbols, as shown in FIG. 3B, together comprise a keypad of the digits zero (0) through nine (9) as they would appear on a typical touch-tone telephone keypad. For example, normal character keys "y", "u" and "i" have respectively as their option symbols "1", "2" and "3". This embodiment includes an option key 628. The keypad is an advantageous aspect of the invention providing ease of dialing a telephone number because the user is typically already familiar with a touch-tone keypad arrangement. FIG. 6A also illustrates another embodiment of the telephone keypad comprising the digits "0" to "9" as option symbols as discussed above as well as the symbols "*" and "#". As shown, the "*" symbol is an option symbol for the key 642 labeled "T" that is next to the key 610 having "1" as an option symbol. Additionally, the "#" symbol is an option symbol for the key 644 labeled with the letter "O" that is next to the key 614 having "3" as an option symbol. In one example, receiving input indicating that the option lock state has been entered, the functionality of dialing a number as on a telephone keypad in either embodiment is provided to a user.

Similarly, in another aspect, the keys associated with the telephone keypad arrangement have a telephone keypad key indicator for distinguishing a telephone keypad key from other keys on the keyboard. This advantageously allows a user to find these keys more readily when using the device. In one embodiment shown in FIG. 6A, the distinguishing indicator is a visual indicator shown as that portion 606, which may be all or less than all, of the area of one or more of the keys associated with the digits "0" to "9" comprising a color different than the keys not associated with the digits "0" to "9". Other examples of indicators providing sensations such as visual, touch or audio sensations to indicate the telephone keys include, but are not limited to, a different tactility, a different surface, for example a surface including a raised knob on a telephone keypad key, a different key shape, a different material, a different back lighting scheme, a different degree of transparency or translucency, an audible signal upon key depression, or a different pattern.

Figure 6B:
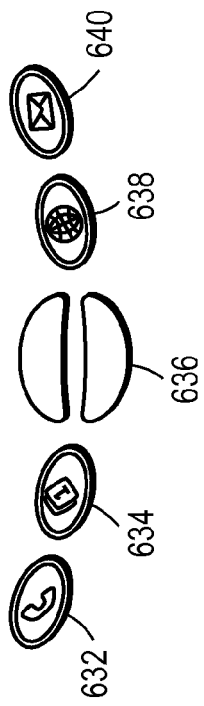
FIG. 6B illustrates an embodiment of a layout of application buttons on the hand-held device.

FIG. 6B illustrates an embodiment of the layout of the application buttons of the hand-held device. In this embodiment, one of the application buttons 632 is associated with a telephone application. Another application button 634 is associated with a calendar application. Another application button 636 is associated with a scroll-up, scroll-down feature. For example, a user may use this feature to scroll through entries in a menu. In this embodiment, application button 638 is associated with an application that provides Internet access. In this embodiment, an application button 640 is associated with a messaging application.

As shown in the embodiment of FIG. 1A, the device further comprises a user input device 126 located on a side 102 of the device, the input of the user input device being processed when the lid is in the closed position as well as in the open position. In this embodiment, the user input device is a jog rocker 126. The jog rocker reacts to four input actions: up, down, press in, and press in and hold. The jog rocker provides for convenient one-handed use to perform a function when the device is in a lid-closed state. Although within the variety of applications offered by the hand-held device, the jog rocker's inputs will have application specific results, the jog rocker may be used to turn on the device and launch a user selectable predetermined application, for example, the telephone application, by a press of the jog rocker or a press and hold of the jog rocker. In this embodiment, the jog rocker's behavior is executed on a jog rocker press rather than release.

FIGS. 11A and 11B illustrate examples of displays shown to a user in response to movements of the jog rocker in a lid-closed state. In one example, if the person wishes to make a telephone call, and the device is in a lid-closed state and a device power-save state, the person may press the jog rocker with one hand. The device receives input indicating activation of the jog rocker. Responsive to the activation of the jog rocker, the device is transitioned from a device power-save state to a device power-on state. In one embodiment, the device power-on state is a state in which the device is fully operational for performing activities including displaying views on the display. The device launches an application and displays a view of the application on the display. A default or a user-selectable view is displayed.

FIG. 11A illustrates a telephone application as the user selectable application. In another example, with the device is in a lid-closed state and a device power-save state, the user presses the telephone application button 112 to activate the telephone application. The device receives input indicating activation of the application button. Responsive to the press of the application button, the device is transitioned from a device power-save state to a device power-on state. The device launches an application associated with the button and displays a view of the application associated with the button on the display.

FIG. 11A illustrates a view of a speed dial menu with an initial highlight on a "Voicemail" screen button. The initial view of an application may also be user selectable. With the lid closed, the speed dial menu shows through the transparent portion 108 of the closed lid 106 on the display 128. Responsive to receiving input indicating activation of the up/down application scroll button or activation of the jog rocker up or down, the view is updated responsive to performing the function of scrolling down as is illustrated by the highlighting of the next item in the list.

FIG. 11B illustrates the highlighting of a screen menu button "Home" associated with a telephone number. Responsive to receiving input indicating a press of the jog rocker, the "Home" number will be dialed. In this way, with a limited number of activations of the jog rocker on the side of the device or of the jog rocker and an application button, which activations may be performed by one hand, the display is protected by the closed lid, and the user can proceed with the call using a hands-free attachment such as a headset.

The behavior of the lid can also activate the performance of functions with respect to the device itself and within an application. Those of skill in the art will understand that control logic, for example hardware and/or software, enclosed within the device, for example the system depicted in FIG. 2, processes input indicating the lid states and/or transitions between lid-states and performs functions with respect to this input. For example, the user interface unit 208 comprising a lid position detector may be embodied in hardware and/or software under the control of the microprocessor 202. In one embodiment, the lid position detector comprises a magnet in the lid and a magnetic field sensor, for example a hall effect sensor, in the front side of the case, for example near the keyboard. The microprocessor 202 may execute software instructions for receiving input indicating the lid states and/or transitions between lid-states and responding to it appropriately from software programs stored in a memory such as read only memory 204, the SDRAM 206, and/or in the user interface unit 208.

FIG. 7 illustrates a matrix table showing examples of actions taken responsive to a transition from one lid-state to another. In one example of lid behavior, responsive to being in a device power-save state and detecting a transition from a lid-closed state to a lid-open state, transitioning the device from the device power-save state to the device power-on state and launching an application.

An application assigned to the lid either by default or by user-selection such as the telephone application may also be launched. In the device power-off state, closing the lid does not effect a change in the device's functioning or power state.

FIG. 7 also describes examples of the results of lid behavior in the device power on state if the device is running the telephone application. In the examples of FIG. 7, a notification time period of one second is used. Responsive to the device being in a power-on-state and a lid-closed state, no action is taken with respect to an incoming call in this embodiment within one second of the incoming call notification. However, after one second of notification, responsive to detecting a transition from the lid-closed state to the lid-open state, the device processes the call including answering the call. The use of opening the lid to answer the call saves the user time in by not having to necessarily find and select additional buttons.

In another example, the device is in a power-on-state and a lid-open state. Responsive to being within one second of the incoming call notification and detecting a transition from a lid-open state to a lid-closed state (e.g. closing the lid), no action is taken with respect to the incoming call in this embodiment.

In another example, the device is in a device power-on state and a lid-open state. The device processes an incoming call notification. An alert to the user may be sent indicating that a call has been received. Responsive to detecting a transition from a lid-open state to a lid-closed state after a notification time period of the incoming call, the call is ignored and the device is transitioned from the device power-on state to the device power-save state. A ring indicating the call may be silenced or a vibration ceased.

During an active call, FIG. 7 illustrates actions taken responsive to the state of the lid when a hands-free attachment, in this example a headset, is being used and when it is not being used. In the embodiment of FIG. 1A, if a user is not using a hands-free attachment such as a headset, the lid will be open so that the user can hear the caller through the speaker 110 in the lid 106. If the user is using a hands-free attachment, opening the lid will not effect the call.

In one example, the device is in a device power-on state and a lid-open state. The device is processing an active call during a no-hands-free attachment state. A no headset state is an example of a no-hands-free attachment state. Responsive to detecting a transition from a lid-open state to a lid-closed state, the active call is ended. An audio, visual or audiovisual confirmation of the hang-up may be generated. For example, the confirmation may be displayed on the display for a period, for example 2 seconds. The device transitions from a device power-on state to a device power-save state. The device allows the user to end the call by closing the lid.

However, if a hands-free attachment is in use such as by a driver, the user may not want to hang-up the call but also does not want to leave the device lid open in a purse or on a seat where it may get scratched or from which it may fall. In this example, the device is in a device power-on state and a lid-open state and is processing an active call during a hands-free attachment state. Responsive to detecting a transition from a lid-open state to a lid-closed state, the device transitions from a device power-on state to a device power-save state. However the active call is maintained by the device until receiving direction to end the call. An example of direction would be input requesting that the call be ended. Such direction may be indicated by detection that a button on a hands-free attachment has been pressed to end the call.

In another example, the device may be in a device power-on state and a lid-closed state. For example, the device received input indicating a depression of the power button 138 while the lid is closed or input indicating activation of a user input device such as one of the application buttons. In this combination of states, the opening of the lid in this example does not does not cause the device switch from a currently running application to one assigned to the action of opening the lid. This is helpful to a user so that the user does not lose her place in the current application by opening the lid.

Figures 8A, 8B:
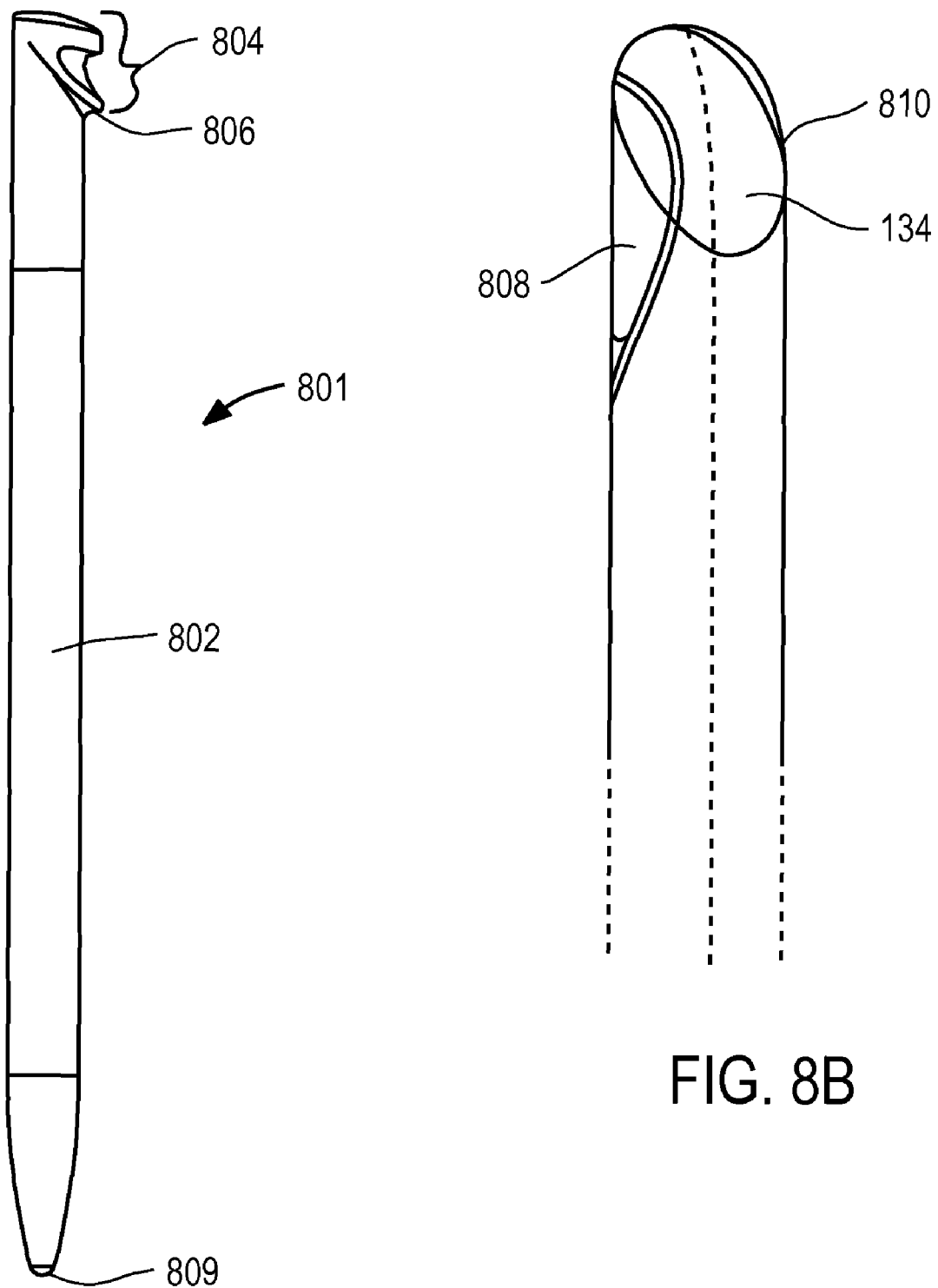
FIG. 8A illustrates an embodiment of a stylus for use with the hand-held device.
FIG. 8B illustrates a cross-sectional view of an upper portion of a stylus holder.
Figure 8F:
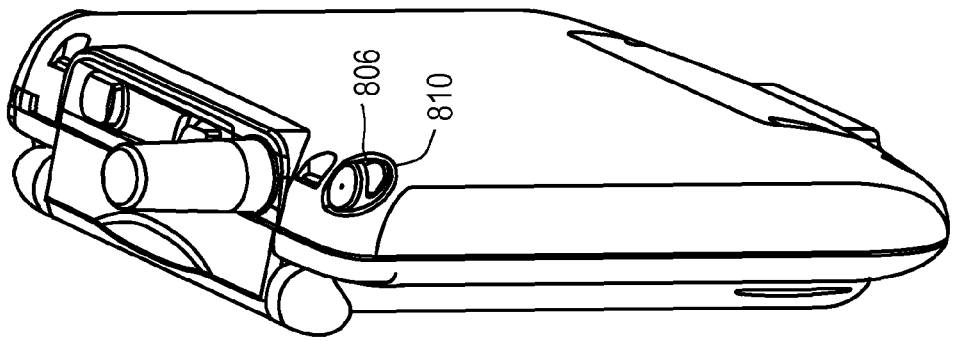
FIGS. 8C, 8D, 8E and 8F illustrate different positions of a head of the stylus during the rotation of the stylus into the stylus holder of the device.

FIG. 8A illustrates an embodiment of a stylus 801 for use with the hand-held device. The stylus has a body portion 802 of an elongated cylindrical shape with a tapered rounded tip 809 and a head portion 804. The head portion 804 has a cam, in this embodiment a lower lip 806 that slopes downward at a first angle.

FIG. 8B illustrates a cross-sectional view of the upper portion of the stylus holder 134. The holder 134 comprises a rim 810 that slopes downward at a second angle which may be equal to the first angle or may be a different angle. The combination of the two angles cause the lip 806 of the stylus head to slide along the rim in a cam movement so as to transform the rotary motion of the stylus into a linear motion downward into the holder. The combination provides for a self-alignment of the stylus with the holder. The interior of the holder comprises a protrusion or an insertion 808 such as a piece of foam rubber, against which the rounded tip 809 of the stylus slides so as to glide the elongated body portion 802 into the holder.

Figure 8E:
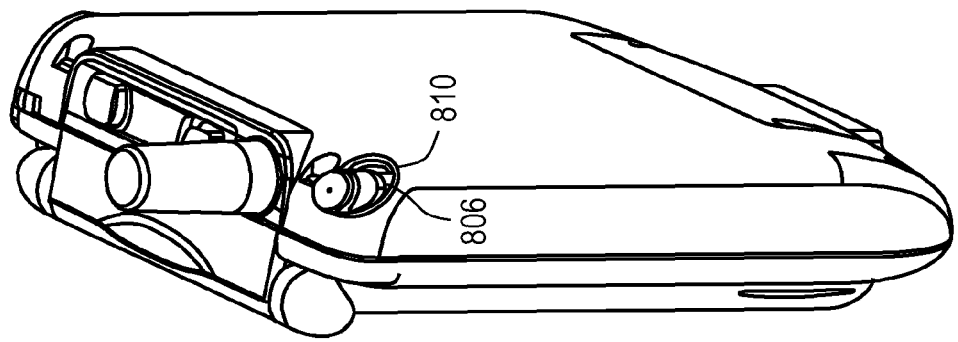
Figure 8D:
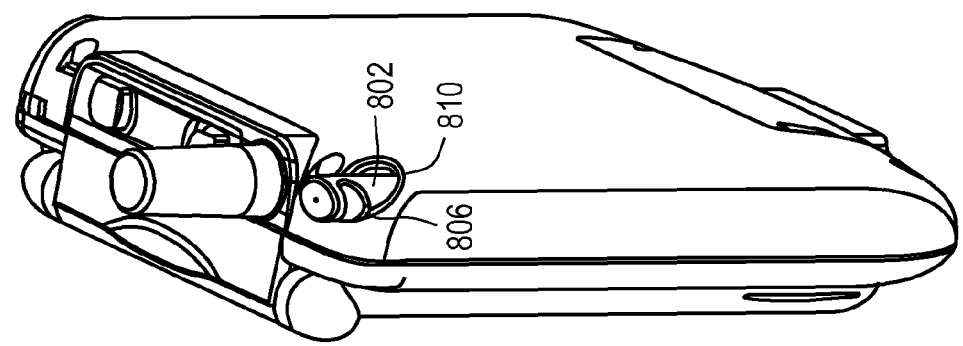
Figure 8C:
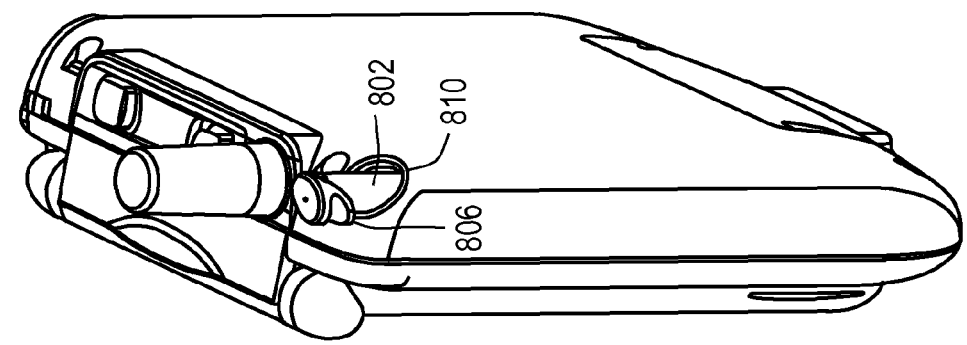

FIGS. 8C, 8D, 8E and 8F illustrate the rotation of the stylus 801 into the holder of the device. In FIG. 8C, the lip 806 contacts the rim 810 of the opening. In FIG. 8D, responsive to linear downward pressure on the stylus, the lip 806 rotates along the upper part of the rim 810 causing the stylus to move further downward into the holder. In FIG. 8E, being guided by the combination of the downward slope of the lip at a first angle and the downward slope of the rim at a second angle, the head further rotates causing the stylus to move further downward. Finally, in FIG. 8F, the lip of the stylus is aligned with the rim of the holder so that the stylus comes to be fully seated in the holder. The use of the lip and rim of the holder 134 allows the stylus to come to full seat in the holder responsive to the linear motion of being pressed down.

FIG. 9A illustrates an embodiment of the door 140 having a card holder for an identification card. The card holder in this embodiment comprises the structures 910A, 910B, 910C and 910D. An example of a card that may be held in place is the subscriber identification module (SIM) card that is commonly used with the GSM communication networks as described above. FIG. 9A illustrates an embodiment of a SIM card 904 having electrical contacts 906.

FIG. 9B illustrates a block diagram view of the device with the door 140 removed to show a card detector unit 244 having a communication coupling 912 to the radio module 234 through a printed circuit board 908 internal to the device. The printed circuit board may embody a system such as the system embodiment shown in FIG. 2. The card detector unit 244 detects the presence of the card. For example, the card detector unit may comprise one or more electrical contacts 914 positioned to contact with one or more electrical contacts 906 on the SIM card. Through the communication coupling 912 with the card detector unit, the radio module 234 will note the lack of the card's presence and the hardware and software will function to alert the user. For example, an alert may be displayed to the user. In another embodiment, the card detector unit comprises a switch for detecting the presence of the card. The switch would also being coupled 912 to the radio module.

Figure 10:
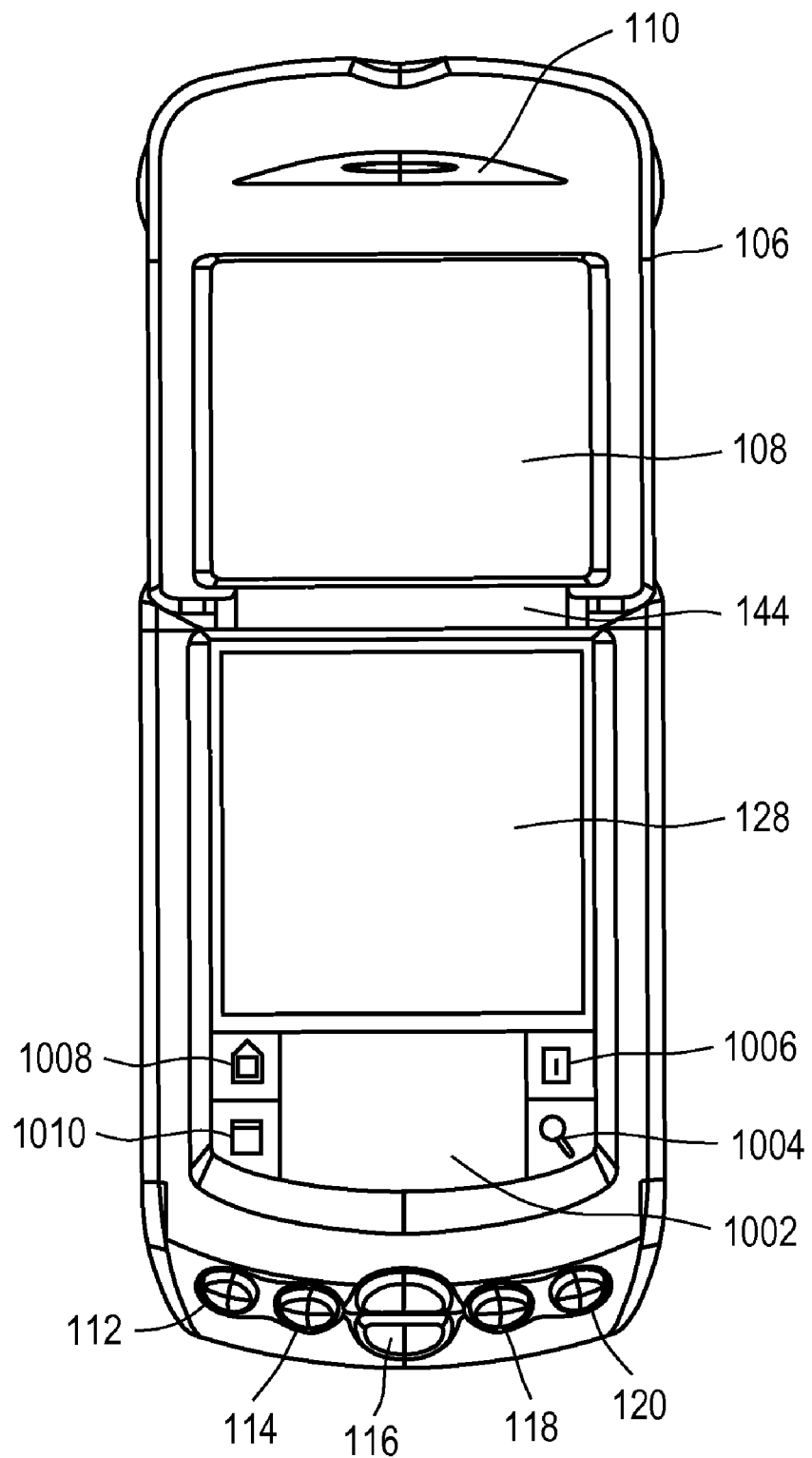
FIG. 10 illustrates an embodiment of the hand-held device comprising a handwriting area upon which a user can enter symbols through the use of a stylus or his or her finger.

FIG. 10 illustrates another version of the embodiment of the hand-held device of FIGS. 1A, 1B and 1C. In the version of FIG. 10, the device comprises a handwriting area 1002 upon which a user can enter symbols through the use of a stylus or his or her finger. The icons surrounding the handwriting area are those typically used with the Graffiti™ program typically implemented in PALM OS® devices. The icons when tapped perform a function associated with the icon. For example, an applications icon 1008 opens applications when tapped. The other icons are the menus icon 1010, the calculator icon 1006, and the find function icon 1004 which allows a user to find text anywhere in his data. In the closed position, the embodiment of FIG. 10 would appear as the embodiment of the device having a transparent lid 108 in the closed position as illustrated in FIG. 1C. This embodiment of a hand-held device also comprises a system such as the example illustrated in FIG. 2 comprising hardware and software for providing communication services and symbol processing. For example, this device also includes radio communications functionality, for example, cellular telephone functionality as discussed above.

The above description is included to illustrate the operation of one or more embodiments and is not meant to limit the scope of the invention. The scope of the invention is to be limited only by the following claims. From the above discussion, many variations will be apparent to those skilled in the art that would yet be encompassed by the spirit and scope of the invention.

What is claimed is:

1. A handheld computing device structured to include a telephone component, comprising:
a display screen;
a keyboard comprising a plurality of keys distributed along at least three rows of keys, wherein a subset of the plurality of keys provides a primary character value and a secondary value;
wherein the first of the three rows of keys includes successive primary values "Q", "W", "E", "R", "T", and "Y", and wherein the subset includes secondary values "1" through "9" so that the subset is arranged in a touch-tone telephone keypad arrangement, the keys in the telephone keypad arrangement having a common visual characteristic distinct from the keys not in the telephone keypad arrangement, the secondary values "1", "2", and "3" being in the first of the three rows of keys, the secondary values "4", "5", and "6" being in a second of the three rows of keys, and the secondary values "7", "8", and "9" being in a third of the three rows of keys, each secondary value associated with a key including a primary value; and
wherein the keyboard also comprises an option key configured to set the keyboard in one of a plurality of states, a first state corresponding to a single use of a secondary value in the touch-tone telephone keypad arrangement, a second state corresponding to consecutive use of any secondary values in the touch-tone telephone keypad arrangement, and a third state corresponding to use of only primary values in the touch-tone telephone keypad arrangement; and
wherein in response to execution of the telephone component, the keyboard is set to the second state for use of the secondary values of the keys in the telephone keypad arrangement.

2. The device of claim 1, wherein a key having a secondary value of "0" is in a fourth row of keys.

3. The device of claim 1, wherein one of the at least three rows of keys of the keyboard includes a key representing at least one of the "*" value and the "#" value next to a key of the telephone keypad arrangement.

4. The device of claim 1, wherein the option key is positioned in one of the three rows of keys.

5. The device of claim 1, wherein each primary value corresponds to a separate key.

6. In a computing device comprising a data entry component and a telephone component, the device having a long axis and a short axis within a plane, a keyboard comprising:
a plurality of keys arranged in a configuration having key rows oriented perpendicularly with respect to the long axis of the device, one of the key rows comprising successive keys representing the letters Q, W, E, R, T, and Y;
wherein the plurality of keys comprises at least nine multi-value keys, each multi-value key associated with at least a primary value and a numeric secondary value, the at least nine multi-value keys having a common visual characteristic and being arranged to form part of the configuration, the at least nine multi-value keys further being arranged in a telephone keypad arrangement, the keys in the configuration comprising at least one key not having the common visual characteristic of the at least nine multi-value keys;
wherein the plurality of keys further comprises an option key configured to set the plurality of keys in one of a plurality of states, a first state corresponding to a single use of a numeric secondary value of a multi-value key, a second state corresponding to consecutive use of any numeric secondary value of the multi-value keys, and a third state corresponding to use of only the primary value of the multi-value key; and
wherein in response to activation of the telephone component, the at least nine multi-value keys initially set to the second state and operable as touch-tone keys.

7. The keyboard of claim 6, wherein the at least nine multi-value keys are arranged in at least three rows, each row comprising at least three multi-value keys.

8. The keyboard of claim 7, wherein the at least three rows comprise:
a first row comprising multi-value keys associated with numeric values of 1, 2, and 3;

a second row comprising multi-value keys associated with numeric values of 4, 5, and 6; and a third row comprising multi-value keys associated with numeric values of 7, 8, and 9.

9. The keyboard of claim 8, further comprising a tenth multi-value key associated with at least a primary value and a numeric secondary value of 0, wherein the tenth multi-value key is arranged in a fourth row.

10. The keyboard of claim 7, wherein the at least three rows comprise:

a first row comprising multi-value keys associated with at least three primary values selected from the group consisting of Q, W, E, R, T, Y, U, I, O, and P, and further associated with numeric values of 1, 2, and 3;

a second row comprising multi-value keys associated with at least three primary values selected from the group consisting of A, S, D, F, G, H, J, K, L, and ";", and further associated with numeric values of 4, 5, and 6; and a third row comprising alphabetic/numeric multi-value keys associated with at least three primary values selected from the group consisting of Z, X, C, V, B, N, M, ",", and ".", and further associated with numeric values of 7, 8, and 9.

11. The keyboard of claim 7, wherein the at least three rows comprise:

a top row comprising multi-value keys associated with numeric values of 1, 2, and 3;

a middle row comprising multi-value keys associated with numeric values of 4, 5, and 6; and a bottom row comprising multi-value keys associated with numeric values of 7, 8, and 9.

12. The keyboard of claim 7, wherein the plurality of keys further comprises at least one additional multi-value key associated with at least a primary value and a secondary value, the additional multi-value key being arranged to form part of the configuration, the at least one additional multi-value key further being arranged in a fourth row, so that the at least nine multi-value keys and the at least one additional multi-value keys collectively emulate a telephone keypad arrangement.

13. The keyboard of claim 12, wherein the at least one additional multi-value key is associated with a numeric value of 0.

14. The keyboard of claim 7, wherein the plurality of keys further comprises at least three additional multi-value keys, each associated with at least a primary value and a secondary value, the at least three additional multi-value keys being arranged to form part of the configuration, the at least three additional multi-value keys further being arranged in a fourth row, so that the at least nine multi-value keys and the at least three additional multi-value keys collectively emulate a telephone keypad arrangement.

15. The keyboard of claim 14, wherein the at least three rows comprise:

a first row comprising multi-value keys associated with numeric values of 1, 2, and 3;

a second row comprising multi-value keys associated with numeric values of 4, 5, and 6; and a third row comprising multi-value keys associated with numeric values of 7, 8, and 9; and wherein the fourth row comprises multi-value keys associated with secondary values of "*", "0" and "#".

16. The keyboard of claim 14, wherein the at least three rows comprise:

a top row comprising multi-value keys associated with numeric values of 1, 2, and 3;

a second row, below the top row, comprising multi-value keys associated with numeric values of 4, 5, and 6; and a third row, below the second row, comprising multi-value keys associated with numeric values of 7, 8, and 9;

and wherein a fourth row, located below the third row, comprises multi-value keys associated with secondary values of "*", "0" and "#".

17. The keyboard of claim 6, wherein the at least nine multi-value keys comprise:

at least one selected from the group consisting of:
a key associated with a primary value of Y and a numeric value of 1,
a key associated with a primary value of U and a numeric value of 2, and
a key associated with a primary value of I and a numeric value of 3;

at least one selected from the group consisting of:
a key associated with a primary value of H and a numeric value of 4,
a key associated with a primary value of J and a numeric value of 5, and
a key associated with a primary value of K and a numeric value of 6; and at least one selected from the group consisting of:
a key associated with a primary value of B and a numeric value of 7,
a key associated with a primary value of N and a numeric value of 8, and
a key associated with a primary value of M and a numeric value of 9.

18. The keyboard of claim 17, further comprising a multi-value key associated with at least a numeric value of 0.

19. In a computing device structured to include a data entry operation and a telephone operation, the device having, within a plane, a long axis and a short axis, a keyboard comprising:

a plurality of keys arranged in a configuration having key rows oriented perpendicularly with respect to the long axis of the device, one of the key rows comprising successive keys representing the letters Q, W, E, R, T, and Y;

wherein the plurality of keys comprises at least ten multi-value keys, each of the at least ten multi-value keys being associated with at least a primary value and a secondary value, the at least ten multi-value keys having a common visual characteristic and being arranged in at least four rows, wherein at least three of the at least four rows each comprise at least three multi-value keys, the keys in the configuration comprising at least one key not having the common visual characteristic of the at least ten multi-value keys;

wherein the plurality of keys further comprises an option key configured to set the at least ten multi-value keys in one of a plurality of states, a first state corresponding to a single use of a secondary value of a multi-value key, a second state corresponding to consecutive use of any secondary value of the multi-value keys, and a third state corresponding to use of only the primary values of a multi-value key; and wherein in response to use of the telephone operation, the at least nine multi-value keys initially set to the second state and operable as a touch-tone keys.

20. The keyboard of claim 19, wherein the plurality of keys arranged in the configuration further comprises at least one multi-value key associated with at least a primary value and a non-alphabetic non-numeric secondary value.

21. The keyboard of claim 20, wherein the at least ten multi-value keys are visually distinguishable from the at least one multi-value key associated with a non-alphabetic non-numeric secondary value.

22. The keyboard of claim 19, wherein the keyboard is horizontally centered about the long axis of the device.

23. The keyboard of claim 22, wherein the at least nine multi-value keys form a block that is not horizontally centered about the long axis of the device.

24. The keyboard of claim 19, wherein the keyboard is positioned on a front face of the device that also includes a plurality of navigation controls positioned symmetrically about the long axis of the device.

25. In a computing device comprising a telephone component configured to establish a telephone call, a keyboard comprising:

a plurality of keys arranged in a configuration of a plurality of rows, one of the rows comprising successive keys having represented thereon the letters Q, W, E, R, T, and Y;

wherein the plurality of keys comprises at least nine multi-value keys arranged within three rows of the plurality of rows, each of the at least nine multi-value keys being associated with at least a primary value and a numeric secondary value, the at least nine multi-value keys having a common visual characteristic and being arranged to form part of the configuration, the at least nine multi-value keys further being arranged in a telephone keypad arrangement, the keys in the configuration comprising at least one key not having the common visual characteristic of the at least nine multi-value keys;

wherein the plurality of keys further comprises an option key configured to set the plurality of keys in one of a plurality of states, a first state corresponding to a single use of a numeric secondary value of a multi-value key, a second state corresponding to consecutive use of any numeric secondary value of the multi-value keys, and a third state corresponding to use of only the primary value of the multi-value key; and wherein in response to activation of the telephone component, the least nine multi-value keys configured to activate the numeric secondary value.

26. The keyboard of claim 25, wherein the at least three rows comprise:

a top row comprising multi-value keys associated with numeric values of 1, 2, and 3;

a second row, below the top row, comprising multi-value keys associated with numeric values of 4, 5, and 6; and a third row, below the second row, comprising multi-value keys associated with numeric values of 7, 8, and 9.

27. The keyboard of claim 25, wherein the at least three rows further comprises a fourth row, located below the third row, the fourth row comprising multi-value keys associated with secondary values of "*", "0" and "#".

28. The keyboard of claim 25, wherein the keyboard is structured below a display in a same plane as the display.

29. The keyboard of claim 25, wherein the each key of the at least nine multi-value keys includes a numerical value and at least one non-numerical character.

30. The keyboard of claim 25, wherein the each key of the at least nine multi-value keys includes a numerical value and at least one alphabet letter.

* * * * *